July 30, 1935.   J. H. POWERS   2,009,815
ELECTRICAL SWITCH GEAR
Filed Nov. 11, 1933   2 Sheets-Sheet 1

Inventor:
James H. Powers,
by Harry E. Dunham
His Attorney.

July 30, 1935.  J. H. POWERS  2,009,815
ELECTRICAL SWITCH GEAR
Filed Nov. 11, 1933   2 Sheets-Sheet 2

Inventor:
James H. Powers,
by Harry E. Dunham
His Attorney.

Patented July 30, 1935

2,009,815

UNITED STATES PATENT OFFICE 2,009,815

ELECTRICAL SWITCH GEAR

James H. Powers, Yeadon, Pa., assignor to General Electric Company, a corporation of New York Application November 11, 1933, Serial No. 697,606

8 Claims. (Cl. 200—15)

My invention relates to electrical switchgear, more particularly to polyphase disconnect switching means for isolating high tension circuits.

The use of disconnect switches, either individually or gang-operated, for isolating busbar connections, oil circuit breaker terminals, etc. in high tension circuits, is well known and accepted practice in the art. In the case of gang-operated disconnect switches, the usual arrangement heretofore comprise a countershaft and interconnecting links and cranks for the individual phase switches which not only necessitated a comparatively large space factor but increased the cost of the switchgear. By way of example, in one form of gang-operated disconnect device the phase disconnect switches are separately and independently mounted for pivotal movement, and insulating rods interconnect the same and the common operating means.

The principal object of my invention is the provision of improved disconnect switching means which shall be simple, compact and inexpensive in construction and efficient and reliable in operation and service.

My invention will be more fully set forth in the following description referring to the accompanying drawings, and the features of novelty which characterize my invention will be pointed out with particularity in the claims annexed to and forming part of this specification.

Figure 1:
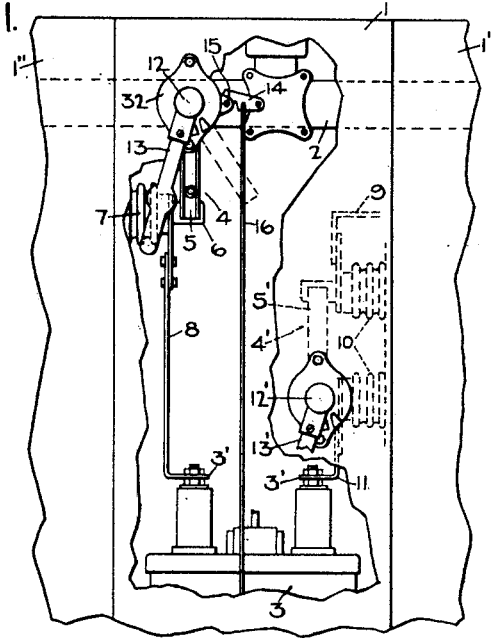
Figure 2:
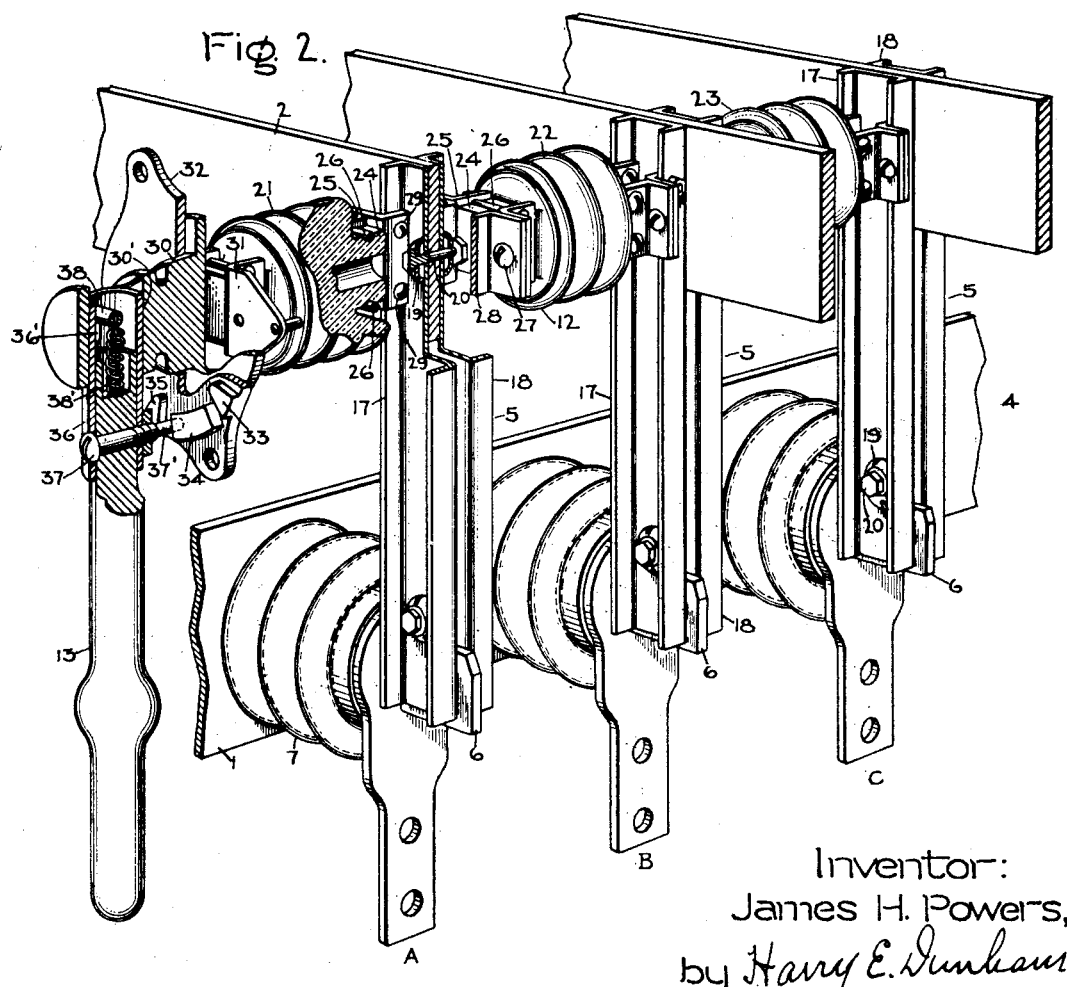

Referring to the drawings, Fig. 1 is an elevational view, partly broken away, of a portion of an electrical switchgear unit to which my invention may be applied; Fig. 2 is a perspective view, partly in section, of a gang-operated disconnect switch embodying the present invention; Fig. 3 is a similar view illustrating another form my invention may assume; Fig. 4 is a similar view of a modified form of disconnect switch blade; Fig. 5 is a transverse view, partly in section, of the disconnect switch member shown by Fig. 4; Fig. 6 is a gang-operated disconnect switch embodying the type of switch member shown by Figs. 4 and 5, and Fig. 7 is an elevational view of a selector switching arrangement illustrating an adaptation of my invention.

Fig. 1 illustrates electrical switchgear of the cubicle or metal-clad type wherein the electrical apparatus and high tension circuits associated therewith are housed by a steel enclosure 1, which in the present case is in the form of a cubicle. Each switchgear unit includes a phase busbar section 2, suitable circuit interrupting means as an oil circuit breaker 3, and disconnect switching means 4 and 4' arranged to isolate the terminals 3' of the oil circuit breaker with respect to the high tension circuit in which the breaker is normally connected.

The disconnect switching means for isolating one phase terminal of the circuit breaker with respect to a busbar section 2 comprises a switching member 5 directly connected to and pivotally mounted on the busbar section 2, the busbar section thus constituting a stationary terminal of the disconnect switch. The other terminal 6 is rigidly mounted by means of an insulator 7 on a side wall of the cubicle and is directly connected by means of a conductor 8 to the corresponding terminal 3' of the circuit breaker. The disconnect switching means 4' for isolating the other terminal of the circuit breaker with respect to the incoming or outgoing branch circuit 9 is similarly mounted, the terminals of the switching member 5' being mounted on the side wall insulators 10. The switching member 5' is pivotally supported on the lower terminal which is directly connected by conductor 11 to the circuit breaker terminal 3'.

The operating member for each of the phase disconnect switching means comprises an insulating shaft which is operated directly to transmit the operating torque to the movable switch member at its fulcrum, thereby eliminating the usual countershafts and interconnecting cranks which necessarily involve a greater space factor and likewise involve insulating problems. In Fig. 1 the operating shafts for the disconnect switching means 4 and 4' are generally indicated at 12 and 12', respectively, the shafts being connected to suitable operating means as manually-operated arms 13 and 13'.

The operation of switchgear of the aforesaid type is well known in the art. Opening or closing of the disconnect switching means may be effected only when the circuit breaker 3 is open so that the disconnect switches are not opened or closed on load currents. Suitable interlocking means may be provided for insuring the aforesaid operation, as for example a pivoted member 14 coacting with a portion of the disconnect switch operating shaft 15 and connected through a link 16 to the circuit breaker tripping means. If the disconnect switch is initially moved towards open circuit position the link 16 is lifted, causing the tripping of the crcuit breaker. Another well-known form of interlocking may be used wherein the disconnect switch is locked in closed position until actuation of the breaker tripping means. The disconnect switch is then unlocked and may be operated.

The switchgear unit above described is arranged to control a single branch circuit, additional branch circuits being housed in separate cubicles indicated at I' and I'' which are aligned and connected to form a well-known type of metal clad bus and switch station.

Referring more particularly to Fig. 2, the disconnect switching means 4 is illustrated as a gang-operated polyphase disconnect switch. Each disconnect switching member 5 comprises a pair of spaced blades 17 and 18, the blades in the present instance being channel-shaped for a purpose hereinafter described. In the closed circuit position the blades of the disconnect switch clamp the stationary terminals as illustrated, the desired contact pressure being effected by spring washers 19, or the like, mounted at opposite sides of the switch member on through-bolts 20. The through-bolts 20 at the busbar terminal of the disconnect switch likewise serve as a pivot for the disconnect switch. It will therefore be apparent that a minimum of electrical connections, terminals, and corresponding insulating supports are required in the present instance for effecting the isolating operation.

The operating means for effecting gang operation of the phase disconnect switch members 5 comprises an insulating shaft 12 which is composed of a plurality of aligned insulating members arranged to interconnect the phase disconnect switches. In the present instance the insulating members comprise insulators 21, 22 and 23 of ceramic material, as porcelain for example, the insulators being aligned with respect to the pivotal supports of the disconnect switches and interconnecting the same so that the operating torque is transmitted through said insulators directly to the disconnect switches at the fulcrums thereof. Porcelain or ceramic insulators are preferable in the case of high tension outdoor installations subject to the deteriorating effects of moisture, etc.

To this end the blades of adjacent phase disconnect switch members are rigidly interconnected, as for example by the insulator 22 between phases A and B. The insulator at each end thereof is provided with squared ends 24 to which a flange 25 is secured and clamped as by through-pins 26. The flange 25 is in turn suitably secured, as by bolts 27, to a coacting flange 28 secured as at 29 to the flanges of the corresponding channel-shaped switch blade. The insulators therefore comprise, together with the disconnect switch members, a sufficiently rigid insulating operating shaft which obviates the necessity for additional insulators and flexible leads or similar connections for making the proper electrical connection to the movable switch member.

The connection between the insulating operating shaft and the manually operated handle 13 comprises a bearing member 30 which is suitably secured to the clamping flange 31 of the insulator 21, and rotatably mounted in a fixed bearing plate 32. The bearing plate 32 is secured to the cubicle housing and has formed thereon raised portions 33, 34 and 35 forming slots therebetween for coacting with latching means secured to the handle 13.

The bearing member 30 is provided with a bore 30' which receives a socket member 36 secured as by a pin 37 to the handle 13. The pin 37 is provided with an extension 37' arranged to coact with the aforesaid slots in the bearing plate. Secured to the bearing member 30 and coacting with a slot 36' in the socket 36 is a pin 38 forming a lost-motion connection between the handle and operating shaft. A compression spring 38' between the pin 38 and the handle 13 serves normally to maintain the handle in the lower position.

The spaces between the aforesaid raised portions 33, 34 and 35 on the bearing plate correspond to the open and closed circuit portions of the disconnect switch. As clearly illustrated by Fig. 2, the switch may be moved from the closed circuit position only by exerting a longitudinal push on the operating handle 13, causing the pin 37' to clear the upper edge of the raised portion 34. The operating handle may then be rotated counterclockwise until open circuit position is reached when the spring 38' will depress the operating handle so that the pin 37' snaps into the space between the portions 33 and 34. The portions 33 and 35 likewise serve as stops so that the shock of the opening or closing operation is borne by the handle structure rather than the blades.

It will be apparent that the above arrangement is readily adapted for double throw operation. For example, the bearing plate 32 may be provided at its upper side with raised portions forming three slots corresponding to the limiting positions in double-throw operation. When the disconnect switch is to be used for double-throw operation, the bearing plate is simply rotated 180° and secured as in Fig. 2 for coaction with the handle latch pin.

For the purpose of minimizing the possible damage due to an extreme short circuit condition, the shaft insulators have longer "creepage" surfaces and provide greater flashover distances than the insulators supporting the stationary contacts. Accordingly, in the event of a short circuit, the fault would be to ground rather than between phases.

In view of the fact that the operating shaft is composed of alternately rigid and yielding portions, namely porcelain and steel or copper, there will be a certain flexing of the shaft between the operating handle and the switch blade farthest therefrom. This flexing results in an improved operation of the switch, namely closing of the switch blades in sequence directly in the order corresponding to the distances from the operating handle. When the switch blades are closed in this manner, as compared with the usual method of slamming all switches closed in unison, the shock and stress is distributed and greatly minimized.

Fig. 3 illustrates a form of gang-operated disconnect switch which is particularly suitable for indoor low voltage installations not subject to moisture or the charring effects of heavy short circuits. In this case the disconnect switch members 40 likewise interconnect the busbars 2 and stationary terminals 6 in the manner above described. The insulators 41, 42 and 43, forming the operating shaft in the present case, may be composed of a suitable insulating compound, as a laminated wood impregnated with a resinous product which has considerable mechanical strength. A simple and rugged connection between the insulators and disconnect switch blades is effected by the square or rectangular end portions of the insulators and the flanges of the corresponding switch blades, the insulators closely fitting between the flanges of the blades 44 and 45 and pinned or bolted thereto as at 46. The blades 44 and 45, as in the previous instance, are pivotally mounted on the busbar 2 by a pin 47 which may abut or extend into the corresponding ends of the insulators 41 and 42. They are likewise resiliently biased into good contact engagement with the stationary terminals, as in the previous instance, by spring washers 48.

The operating means 13 is generally similar to that of Fig. 2. The circuit breaker interlock is shown as comprising a pin 49 secured to flange 31 arranged to engage the pivotal member 14 so as to raise the link 16 and trip the breaker when the operating shaft is rotated counterclockwise to open the disconnect switch.

Figs. 4 and 5 show a form of disconnect switch member 50 particularly adapted for carrying large currents without overheating. The insulator 51 of the operating shaft is secured to switch blade 2 by bracket-like flanges 53 and 54 generally in the manner shown in Fig. 2. The brackets 53 are rigidly secured to the switch blades as by an extension 55 bolted thereto as at 56. The blades 52 are biased towards each other by washers 57 secured at opposite ends of bolts 58. For the purpose of insuring high current-carrying capacity, the blades 52 are provided with raised portions 52' so that high pressure line contact exists between the switch blades and corresponding terminals 59 and 60. The line contact at the terminal 60 may comprise a transverse ridge-like portion 52 forming a part of the switch blade. The line contact at the pivotal support or busbar may comprise a circular ridge about the pivotal support 58.

Fig. 6 illustrates a simplified form of gang-operated switch embodying the present invention wherein the disconnect switch is operated by a pullrod including a hook coacting with an eye 61. In the present instance the disconnect switch members 50 are generally similar to the type illustrated by Figs. 4 and 5 and are interconnected by insulators 51 to form an operating shaft of the character above described. This arrangement results in a simplified and efficient gang-operated disconnect switch of the pullrod type.

Fig. 7 illustrates one of many forms of switching arrangements to which the present invention is particularly adapted. The arrangement comprises a selector switch associated with a bus 62, intermediate contacts 63 and terminals 64. The disconnect switch 65 may directly connect the bus 62, in the manner above described, to an intermediate contact 63, and the disconnect switch 66 may directly connect the terminal at 64 to the other intermediate contact at 63. The above arrangement obviously requires very little space as compared with the usual disconnect switch arrangement and is much simpler in construction.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. In electrical switchgear, polyphase disconnect switching means for isolating high tension circuits comprising a plurality of single phase switch members, each member comprising a pair of blades, a pair of stationary terminals for each phase switch member arranged to be clamped between said blades in the closed circuit position, one of said terminals constituting a pivotal support for the coacting blades, and an insulating operating shaft for effecting direct gang operation of said phase switch members at said pivotal supports comprising a plurality of aligned insulators, each insulator positioned between a pair of stationary terminal supports and secured to and interconnecting the corresponding blades of adjacent phase switch members.

2. In electrical switchgear, polyphase disconnect switching means for isolating high tension circuits comprising a plurality of single phase switch members, each of said members comprising a pair of spaced channel-shaped blades, a pair of stationary terminals for each phase switch member arranged to be clamped between said blades at opposite ends thereof in closed circuit position, one of said terminals constituting a pivotal support for said blades, and an insulating operating shaft for effecting direct gang operation of said switch members at said pivotal supports comprising a plurality of aligned insulating members, the blade of one switch member and the nearest blade of the adjacent phase switch member being interconnected by one of said insulating members, said insulating member having a generally rectangular cross section arranged to fit within said channel sections at the aforesaid pivotal supports so as rigidly to interconnect said insulating member and switch blades.

3. In electrical switchgear, polyphase disconnect switching means for isolating high tension circuits comprising a plurality of single phase switch members, each member comprising a pair of spaced blades, a pair of stationary terminals for each phase switch member arranged to be clamped between said blades in the closed circuit position, one of said terminals constituting a fixed pivotal support for said blades, and an insulating operating shaft for effecting gang operation of said switch members comprising a plurality of aligned insulators of ceramic material, and clamping means associated with each of said blades at the corresponding pivotal support thereof for rigidly securing to said blade one end of an insulator, the blades of adjacent phase switch members being similarly interconnected by an insulator so that the operating torque is transmitted by said insulators through said switch members at the fulcrums thereof.

4. In electrical switchgear, disconnect switching means for isolating high tension circuits comprising a pivotal switch member, a rotatable shaft for operating said member, a handle for manually operating said shaft, latching means for said shaft comprising a fixed member, a pin carried by said handle, and means biasing said handle so that said pin is normally in engagement with restraining portions of said fixed member.

5. In electrical switchgear, disconnect switching means for isolating high tension circuits comprising a plurality of phase switch members, each of said members comprising a pair of spaced blades, a pair of stationary terminals for each switch member arranged to be clamped between the blades thereof, one of said stationary terminals constituting a fixed pivotal support for said switch member, a plurality of insulators interconnecting said switch members and aligned with respect to said pivotal supports, each insulator being secured at its opposite ends to the blades of adjacent phase switch members, and means forming an eye on one of the intermediate switch members, operation thereof effecting gang operation of the polyphase switching means through said insulators.

6. In electrical switchgear, polyphase disconnect switching means comprising a plurality of phase switch members having metal portions, comparatively rigid insulators interconnecting said members to form therewith a rotatable operating shaft, and operating means connected to one end of said shaft for effecting rotation thereof and pivotal movement of said switch members, said insulators and switch members being interconnected so that the flexing of said metal portions between insulators results in sequential operation of said switch members.

7. In electrical switchgear, disconnect switching means comprising a switch member, a rotatable shaft for operating said member, a handle for manually operating said shaft, latching and positioning means for said shaft comprising a fixed member, a socket member secured to one end of said handle, said socket member and shaft having a pin and slot connection, a pin carried by said handle arranged to coact with a plurality of positioning slots formed by said fixed member, and a spring interconnecting said shaft and handle normally biasing said handle so that said pin is restrained by said slots, rotation of said handle being preceded by longitudinal movement thereof so that said pin clears said positioning slots.

8. In electrical switchgear, polyphase disconnect switching means comprising a plurality of single phase switch members, a pair of stationary terminals interconnected by each of said switch members, an insulating shaft for effecting gang-operation of said switch members comprising a plurality of aligned insulators rigidly connected to and spaced by said switch members, and fixed insulators on which said terminals are mounted, said shaft insulators between phases having a creepage surface greater than that of said fixed insulators for minimizing interphase faults.

JAMES H. POWERS.